UNITED STATES PATENT OFFICE.

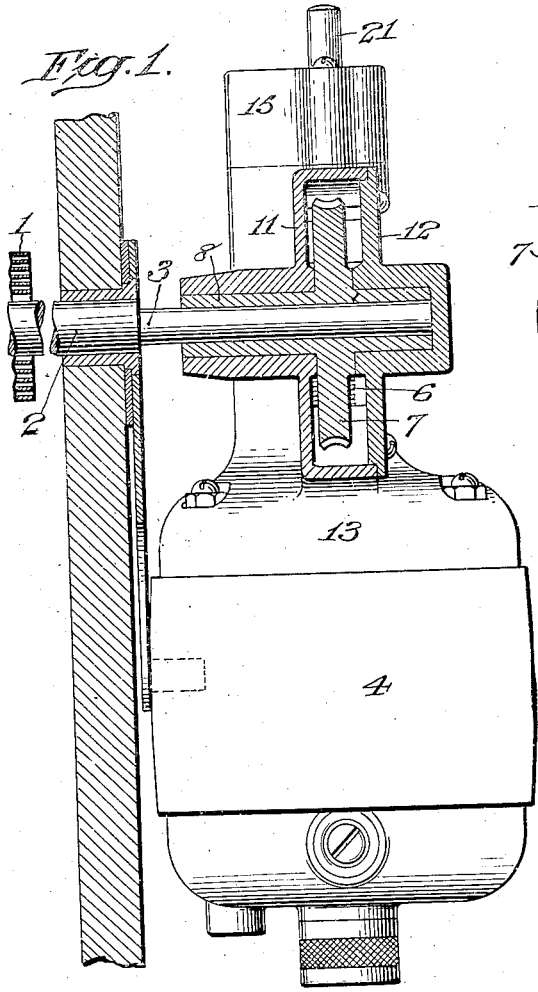
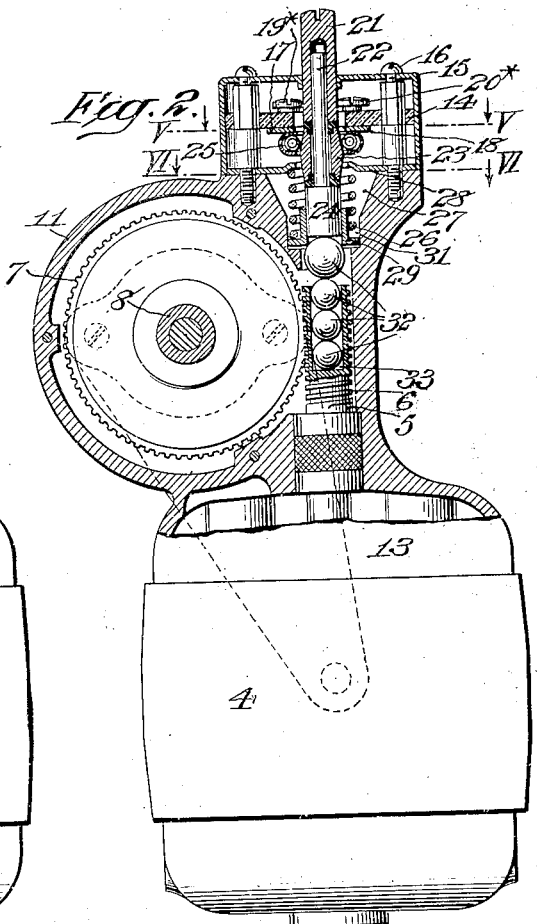
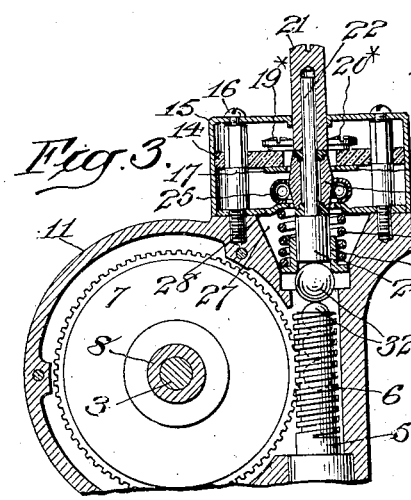
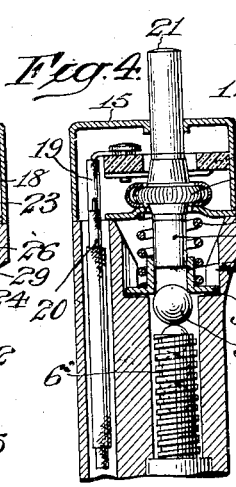
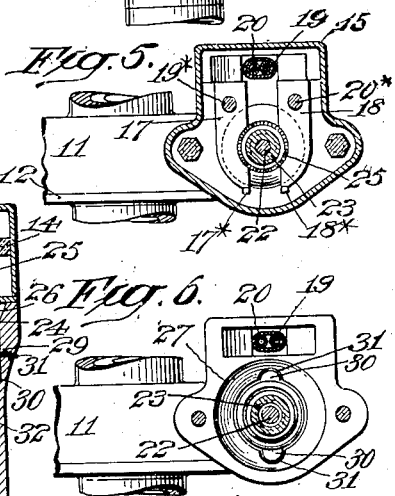

JOSEPH W. JONES, OF NEW YORK, N. Y.

WINDING DEVICE FOR SPRING-MOTORS.

1,394,907.

Specification of Letters Patent. Patented Oct. 25, 1921.

Application filed April 12, 1919. Serial No. 289,705.

*To all whom it may concern:*

Be it known that I, JOSEPH W. JONES, a citizen of the United States, and resident of the borough of Manhattan, in the city and State of New York, have invented a new and useful Improvement in Winding Devices for Spring-Motors, of which the following is a specification.

The invention includes a winding motor and means for connecting it to the spring motor, said means comprising a movable element, such for instance as a longitudinally movable rotary shaft, whose endwise movement is accomplished by pressure exerted thereon by the varying resistance of the spring motor spring.

The invention more particularly includes an electric winding motor and its controlling switch, said switch being opened by the longitudinal movement of the rotary shaft, which shaft has a winding connection with the spring motor, endwise pressure exerted by the tendency of the spring motor spring to unwind being imparted to the shaft for moving it in a direction to open the switch for stopping the winding motor when the spring motor spring has been wound up to a predetermined degree of tension, other pressure means, such for instance, as a spring, being employed for moving the shaft endwise in the opposite direction without closing the switch, the movement of the shaft being accomplished by the overbalancing of the pressure of either one of the two shaft moving means due to the varying resistance of the spring motor spring as it is wound and unwound. Manually operated means is employed for closing the switch to start the winding motor whenever so desired, no automatic means being provided for this purpose.

In the accompanying drawings,

Figure 1 represents the winding device shown partly in elevation and partly in section.

Fig. 2 is a similar view taken at right angles to Fig. 1, the motor controlling switch being shown in its closed position, Fig. 3 is a detailed section similar to Fig. 2, with the motor controlling switch shown in its open position, Fig. 4 is a detailed section taken at right angles to Fig. 3, with the parts in the positions they assume when the spring motor spring is unwound and the switch still open.

Fig. 5 is a transverse section taken in the plane of the line V—V of Fig. 2, and Fig. 6 is a transverse section taken in the plane of the line VI—VI of Fig. 2.

The spring motor spring is denoted by 1, its winding shaft by 2, and the extension shaft by 3. The winding motor 4 is in the present instance an electric motor and it is provided with a longitudinally movable rotary armature shaft 5. This shaft has a winding connection with the spring motor spring through a worm 6 on the armature shaft and worm gear 7, on a sleeve 8, surrounding the extension shaft 3 of the spring motor. The housing for the gears comprises, parts 11, 12 and 13.

The controlling switch for the electric motor comprises the plate 14 of insulating material and the shell 15 secured in position on the gear housing by the screws 16. Two circuit contact pieces 17, 18 are electrically connected to the circuit wires 19, 20 of the electric motor by the screws 19*, 20*, which also serve to secure the contact pieces to the under side of the plate 14, the ends of said contact pieces being turned upwardly as shown at 17*, 18* into the body of the plate to prevent the pieces from turning. The longitudinally movable plunger of the switch comprises the members 21, 22 and 23.

The shank of the member 22 is secured within the members 21 and 23 and is provided with a head 24, between which head and the inner end of the member 21 the member 23 is located. This member 23 is provided with oppositely tapered portions surrounded by a yielding contact ring 25 arranged to be snapped into and out of engagement with the contact pieces 17 and 18 to close and open the circuit for starting and stopping the winding motor.

The upper member 21 of the switch projects upwardly beyond the shell 15 to serve as a manually operated means for closing the switch and thereby the circuit to start the winding motor at pleasure.

A coil spring 26 is located in the recess 27 of the gear housing between a plate 28 at the top of the recess and the flange of a sleeve 29, which sleeve is held against rotary movement by providing it with ears 30, sliding in slots 31, in the walls of the recess 27. This sleeve 29 is slidable on the head 24 of the switch plunger member 22. A series of axially arranged anti-friction balls 32 is interposed between the shaft 5 and the switch plunger, the upper ball contacting at all times with the sleeve 29 and sometimes with the enlarged head 24 of the switch plunger member 22. The lower balls are held in alinement by being located in an axial recess 33 in the upper end of the said shaft 5.

The operation of the device is as follows: Assuming the spring motor spring has been unwound to a predetermined low tension and that the switch has been closed by manually forcing the plunger inwardly, the rotary movement of the armature shaft due to the operation of the electric winding motor will wind up the spring motor spring through the geared connection to a point where the endwise pressure on the armature shaft due to the increased tension of the spring motor spring will move the armature shaft endwise against the pressure exerted by the spring 26 into position to open the switch. This will automatically cause the electric winding motor to stop and thereby cease winding the spring motor spring. As the spring motor spring unwinds, its endwise pressure on the armature shaft will be lessened and the spring 26 will through the contact of the sleeve 29 with the row of balls, force the armature shaft endwise in the opposite direction, without, however, closing the switch, the members 21, 22, 23 and 25 maintaining their positions. Whenever it is desired to start the motor, the switch plunger is depressed, thereby causing the member 25 to close the circuit.

From the above description, it will be seen that the operator may control the times when the winding motor is to act, thus obviating the ability of the winding motor to act automatically to wind the spring motor spring, as for instance, during the playing of a record in a talking machine. This device will also prevent the unintentional winding of the spring motor spring by the winding motor.

What I claim is:

1. In a winding device for spring motors, a winding motor, and means for controlling the stopping and starting of the winding motor including two separable elements, the first element being movable in one direction by an increased resistance of the spring motor spring for moving the second element to stop the winding motor, the first element being movable away from the second element by a decreased resistance of the spring motor spring, whereby the second element may be manually moved only, to start the winding motor.

2. In a winding device for spring motors, a winding motor, and means for controlling the stopping and starting of the winding motor including two separable elements, the first element being movable in one direction by an increased resistance of the spring motor spring for moving the second element to stop the winding motor, the first element being movable away from the second element by a decreased resistance of the spring motor spring, whereby the second element may be manually moved only, to start the winding motor, and means for yieldingly holding the last named element in either of its positions.

3. In a winding device for spring motors, an electric winding motor, a switch therefor, and means for controlling the stopping and starting of the winding motor including two separable elements, the first element being movable in one direction by an increased resistance of the spring motor spring for moving the second element to open the switch and stop the winding motor, the first element being movable away from the second element by a decreased resistance of the spring motor spring, whereby the second element may be manually moved only, to close the switch and start the winding motor.

4. In a winding device for spring motors, an electric winding motor, a switch therefor, and means for controlling the stopping and starting of the winding motor including two separable elements, the first element being movable in one direction by an increased resistance of the spring motor spring for moving the second element to open the switch and stop the winding motor, the first element being movable away from the second element by a decreased resistance of the spring motor spring, whereby the second element may be manually moved only, to close the switch and start the winding motor, said switch serving to yieldingly hold the second element in either of its positions.

5. In a winding device for spring motors, an electric winding motor, its armature shaft, a switch, and a plunger for controlling the switch, said armature shaft being movable in one direction by an increased resistance of the spring motor spring for moving the plunger to open the switch and stop the winding motor, the armature shaft being movable away from the plunger by a decreased resistance of the spring motor spring, whereby the plunger may be manually moved only, to close the switch and start the winding motor.

6. In a winding device for spring motors, an electric winding motor, its armature shaft, a switch, and a plunger for controlling the switch, said armature shaft being movable in one direction by an increased resistance of the spring motor spring for moving the plunger to open the switch and stop the winding motor, the armature shaft being movable away from the plunger by a decreased resistance of the spring motor spring, whereby the plunger may be manually moved only, to close the switch and start the winding motor, said switch serving to yieldingly hold the plunger in either of its positions.

7. A winding device for spring motors including a switch, an electric winding motor, means connecting it to the spring motor including a rotary shaft movable endwise in one direction by the increased resistance of the spring motor spring to open the switch to stop the winding motor, the endwise movement of the shaft in the opposite direction having no effect on the switch, and manually operated means for closing said switch to start the winding motor.

8. A winding device for spring motors including a switch, an electric winding motor, means connecting it to the spring motor including a rotary shaft movable endwise in one direction by the increased resistance of the spring motor spring to open the switch for stopping the winding motor, automatic means to move the shaft endwise in the opposite direction when the resistance of the spring motor spring is reduced, without closing the switch, and manually operated means for closing the switch to start the winding motor.

9. A winding device for spring motors including a switch, an electric winding motor, means connecting it to the spring motor, including a rotary shaft movable endwise in one direction by an increased resistance of the spring motor spring for opening the switch to stop the winding motor, automatic means for moving the shaft endwise in the opposite direction without closing the switch, and manually operated means for closing the switch to start the winding motor.

10. A winding device for spring motors including a switch having a movable plunger element, an electric winding motor, means connecting it with the spring motor comprising a rotary shaft movable endwise in one direction by increased resistance of the spring motor spring to move the plunger element in one direction for opening the switch, said plunger being manually moved in the opposite direction to close the switch, and a spring pressed element to move the shaft endwise in the opposite direction when the spring motor spring resistance is lessened, without closing the switch.

11. A winding device for spring motors including a switch having a movable plunger element, an electric winding motor, means connecting it with the spring motor comprising a rotary shaft movable endwise in one direction by increased resistance of the spring motor spring to move the plunger element in one direction for opening the switch, said plunger being manually moved in the opposite direction to close the switch, and a spring pressed element slidable on the plunger element to move the shaft endwise in the opposite direction when the spring motor spring resistance is lessened, without closing the switch.

In testimony that I claim the foregoing as my invention, I have signed my name this twenty-second day of March, 1919.

JOSEPH W. JONES.